United States Patent [19]
Hirdes

[11] Patent Number: 6,044,200
[45] Date of Patent: Mar. 28, 2000

[54] HOT FLUID DISPENSER WITH INNER RESERVOIR CONTAINING MELTABLE MATERIAL AND HEAT PIPES TRANSFERRING HEAT TO OUTER RESERVOIR

[75] Inventor: Viviane Ruth Toledo Ribeiro Hirdes, São José dos Campos-SP, Brazil

[73] Assignee: Paulo Aparecido Cunha, São José dos Campos -SP, Brazil

[21] Appl. No.: 09/200,091

[22] Filed: Nov. 25, 1998

[30] Foreign Application Priority Data

Nov. 27, 1997 [BR] Brazil ..................................... 9705937

[51] Int. Cl.[7] ...................................................... F24H 1/44
[52] U.S. Cl. .......................... 392/341; 219/530; 126/400; 126/610; 165/104.17
[58] Field of Search ....................................... 392/341, 346, 392/340; 219/530, 540; 126/263.01, 344, 362, 610, 615, 400, DIG. 910; 165/104.17, 104.21

[56] References Cited

U.S. PATENT DOCUMENTS

| 2,460,765 | 2/1949 | Palaith | 165/104.17 |
| 3,543,001 | 11/1970 | Axlander | 165/104.17 |
| 4,131,785 | 12/1978 | Shutt | 219/530 |
| 4,266,598 | 5/1981 | Mutti | 165/104.17 |
| 4,714,821 | 12/1987 | Jakobsson | 392/341 |

FOREIGN PATENT DOCUMENTS 2232748  2/1975  France .

*Primary Examiner*—John A. Jeffery
*Attorney, Agent, or Firm*—Darby & Darby

[57] ABSTRACT

A hot fluid dispenser comprises a first reservoir (1) for the fluid (usually water); at least one heating source (7, 8) operatively associated with the first reservoir 91); and at least a second reservoir (9) defining an interface with the first reservoir (1) and containing a melting material having a high latent heat of fusion. A plurality of heat pipes (10) is provided through said interface, in order to accelerate and homogenize the heat transfer between the two reservoirs.

11 Claims, 2 Drawing Sheets

HOT FLUID DISPENSER WITH INNER RESERVOIR CONTAINING MELTABLE MATERIAL AND HEAT PIPES TRANSFERRING HEAT TO OUTER RESERVOIR

FIELD OF THE INVENTION

In the world, the continued increase of energy demand has encouraged researches in new energy sources and improvements on energy saving. In this context, this invention intends to optimize the most common way of providing and storing hot water: the boiler.

BACKGROUND OF THE INVENTION

A typical boiler, used for heating purposes, consists in a hot water container which has thermal insulated walls, an outlet nozzle for water consumption and an inlet nozzle for water replacement. In this system, the water temperature is usually increased and maintained with a desired range by on electric or a gas heater. For saving energy during water heating, the basic system may be combined with a solar power supply.

In energy storage systems, it is desired an increase of the heat storage capacity and a reduction of the heat losses. A known way to increase the storage capacity is by using phase change of a material with a high latent heat of fusion. For a boiler, this should be done by introducing into a closed reservoir a melting material, such as paraffin, which has its melting point between the operational temperature range of the boiler. Therefore this boiler will store more energy than a conventional one, without paraffin.

In a system, as described above, the energy accumulation process is the following: during heating, the energy is stored by sensible heat of the water and the paraffin. When the melting point is reached, the heat absorption rises due to the phase change and it begins to store a great amount of energy by latent heat of fusion without any temperature increase. In conventional boilers, with the same volume of water, it will be necessary a great temperature increase to store the same energy value.

While hot water is replaced by cold water during the use, the temperature of the resulting water mixture and the paraffin reservoir drop. When the paraffin reaches its solidification temperature, it starts to solidify and discharge a great amount of heat to the water, without changing the temperature, as in the melting process. Together with the increase of energy storage capacity, the introduction of paraffin minimizes the heat losses to the environment, for the same amount of energy stored. Since water temperature is smaller in a boiler with paraffin reservoir and sure the heat losses are proportional to the temperature difference between boiler and the surrounding, the system wastes less heat.

To be useful, this new system must maintain enough hot water volume to guarantee the supply even during peaks of use and the time necessary to have the heat transfer from the paraffin to the water. In practice, the system will not present any advantage if, even storing a great amount of heat, it cannot replace quickly heat of the consumed water. Then, the boiler efficiency is measured by the speed with which the paraffin heats the water after it is cooled by the make up water or by the waste of heat to the surrounding.

The paraffin reservoir must provide an interface between water and paraffin, made of a high thermal conductive material in order to allow a fast heat transfer condition, either from water to the paraffin during the heating, or in the opposite direction when the water is colder than the paraffin.

Nevertheless, there is a problem during the heat transfer from paraffin to water. The solidification process starts near the interface wall and a solidification front spreads into the reservoir. As the solid paraffin near the wall acts like a thermal insulation, it results in a temperature stratification, slowing the system performance. The goal of this invention is to minimize the stratification effects and to prevent the insulation layer of paraffin from solidifying.

SUMMARY OF THE INVENTION

The object of the present invention is to provide a hot fluid dispenser having a melting material as a thermal energy storage medium which can maintain a suitable transfer rate of heat between the melting material and the fluid being heated, independently of the wall of solidified melting material formed in the interface thereof.

The above cited object is achieved by the provision of a hot fluid dispenser comprising: a first reservoir (1) for the fluid, having a make up fluid inlet pipe (5), a hot fluid outlet pipe (6); at least one heating source (7, 8) operatively associated with the first reservoir (1) in order to heat the stored fluid; and at least a second reservoir (9) having, with the fluid in the first reservoir (1), an interface of a high thermal conductibility material and containing a melting material having a high latent heat of fusion and a melting point between the solidification and vaporization temperatures of the fluid.

According to the invention, there are provided a plurality of heat pipes in that there is provided a plurality of heat pipes through said interface, each heat pipe (10) having a portion of its extension immersed in the melting material and the remaining portion immersed in the stored fluid, the melting point of the melting material being within the operational temperature range of the heat pipes.

The heat pipes are assembled through the reservoirs in order to surpass the solid layer formed and reach the central liquid region of the melting material. Thus, the amount of captured energy increases because the heat pipes enlargers the exchange area and the heat transfer between the fluid and the melting material continues even after the solidification is started. The good performance is possible because heat pipes are excellent heat exchangers. They transport energy as latent heat of vaporization, which is usually several times larger than that which can be transported as sensible heat in a conventional convective system.

The heat-pipe has another good characteristic, which is to maintain the same temperature along its length. This effect helps to homogenize the temperatures where it passes, length minimizing temperature stratification and all its bad effects, like thermal tensions, solidified layer, fluid mixtures not homogenized, etc.

A well desired heat-pipe has a great thermal transfer capacity because it is designed to work with an internal fluid in continuous phase change along its length, and thus in a constant temperature.

Inside the heat pipe, the fluid is in a cyclic process of condensation—evaporation. To move the fluid and obtain its heat exchanger effect, a porous medium is assembled into the tube and becomes saturated with the liquid phase of the fluid, it appears capillary tensions pumping the liquid. As the fluid is in a constant temperature and the tube is made of a high thermal conductive material, the exterior will be in almost the same temperature.

When this new boiler is used to store heated water from a solar heating system, it is expected an efficiency increment._

As the water will work in almost all time in a lower temperature than the working temperature in conventional boiler, the solar panel will convert more solar radiation in water heating since its capacity growth when it works with a lower inlet water temperature. Further, working with a lower temperature, will make possible to minimize the energy wasted in the piping.

It is possible to improve the quality of the consumed fluid (water) temperature by positioning the inlet and outlet piping close to the heater and through the melting material (paraffin) and then obtain an extra heating path.

BRIEF DESCRIPTION OF THE DRAWINGS

The invention will be described below, with reference to the attached drawings, in which.

DESCRIPTION OF THE ILLUSTRATED EMBODIMENT

Figure 1:
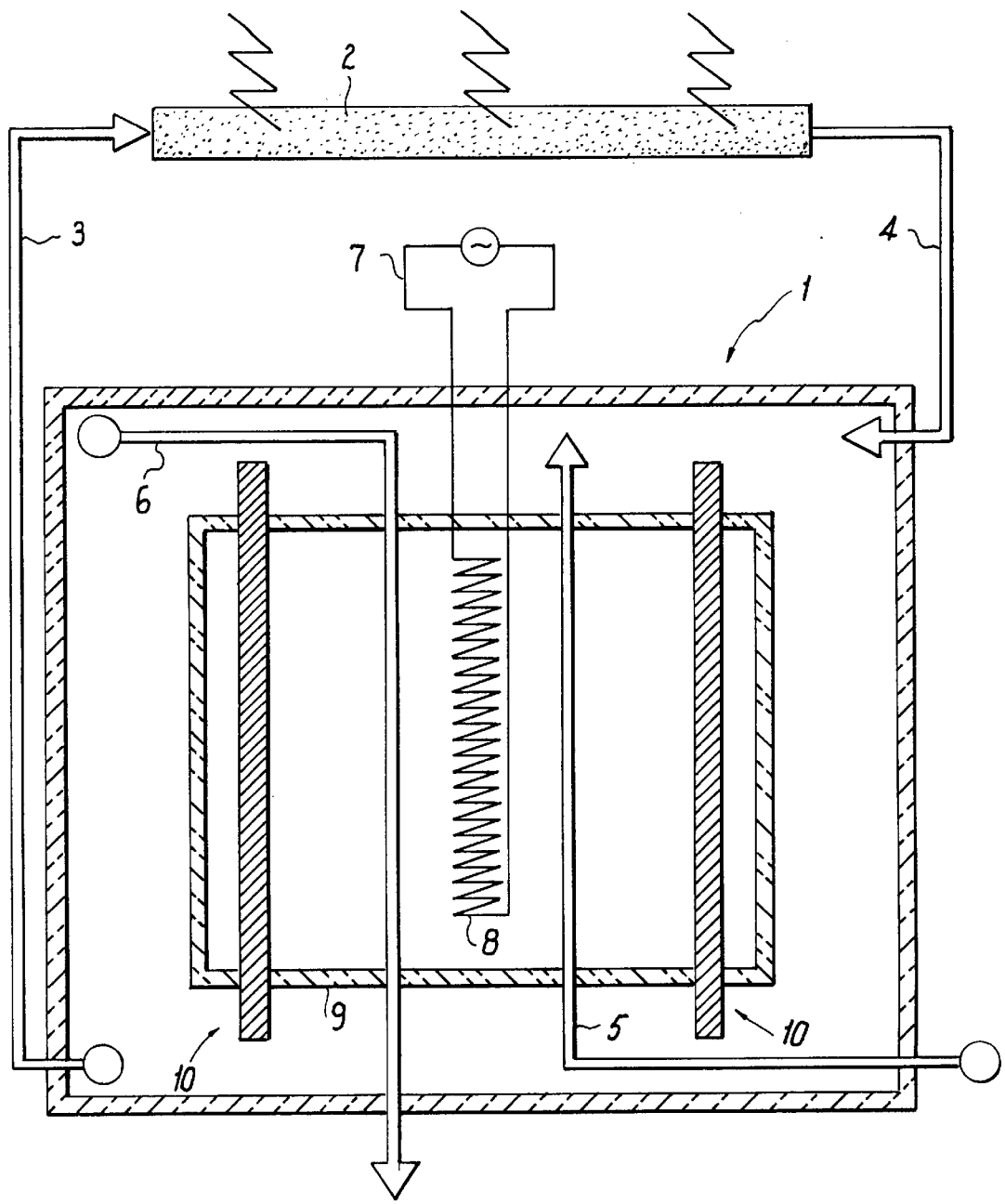
FIG. 1 represents, schematically, the hot fluid dispenser of the invention when associated with a heat source and with a solar heating assembly.

According to FIG. 1, the hot fluid dispenser of the present invention has the form of a boiler comprising a first reservoir 1 for containing the fluid to be heated and dispensed, said fluid being usually water to be supplied to residential, commercial or industrial applications.

The first reservoir 1 is connected to a solar collector 2 by a feeding pipe 3 and a return pipe 4 to bring heated water from the solar collector 2 to the first reservoir 1. The first reservoir is also connected to a make up fluid inlet pipe 5 and to a fluid outlet pipe 6 leading to the points in which the hot fluid is to be consumed.

As illustrated, the hot fluid dispenser is provided with a heating source defined by an electric energy source 7 feeding an electric heater 8 mounted inside the LUi first reservoir 1. It should be understood that the electric heater 8 may be substituted by a gas heater fed from a gas source.

The hot fluid dispenser of the invention further comprises a second reservoir 9 which, in the illustrated embodiment, is mounted inside the first reservoir 1, in order to be surrounded by the fluid contained in the latter. However, it should be understood that the second reservoir 9 can be constructed in different forms and also attached externally to first reservoir 1 as a single unit or as a plurality of units, each one, having an interface of high thermal conductibility material and containing a melting material having a high latent heat of fusion and a melting point between the solidification and vaporization temperatures of the fluid to be heated.

In the present example in which the fluid is water, the chosen melting material is paraffin, with its melting point between 0° and 100°.

In the hot fluid dispensers with the above construction, when the water is being heated, part of the heat received from the heating sources is transferred to the melting material by conduction through the interface of the two reservoirs. The melting material temperature rises until its melting point, when it melts and stores energy as latent heat of fusion without changing its temperature.

During the hot fluid consumption, it is observed that the stored fluid becomes cooler, as a consequence of the mixture with the replacement of fluid, and then the melting material temperature follows this tendency and also decreases. When the melting material reaches its solidification landing, a freezing process occurs and a great amount of heat is discharged from the melting material to the fluid, without changing the temperature, like in the melting process.

With this new boiler configuration, for a same amount of heating, the system works in a lower temperature than the conventional one. Since the solar collectors 2 convert more solar radiation and the surrounding losses decrease as lower is the inlet fluid temperature, it is possible to obtain profits on solar thermal absorption and on the system storing capacity.

Usually, during the consumption, the temperature in the melting material is higher than in the fluid, then it is possible to increase the fluid temperature by mounting the make up fluid inlet pipe 5 and the fluid outlet pipe 6 through the melting material, thus obtaining an extra heating. These effects could be also intensified by mounting said inlet and outlet pipes close to the heating device 8 which can be mounted into the second reservoir 9, or into the first reservoir 1.

In order to accelerate and homogenize the heat transfer between the melting material and the fluid, independently of the thermal barrier defined by the solidified melting material closer to the interface between the two reservoirs, there is provided a plurality of heat pipes 10, each one having a portion of its extension immersed in the melting material and the remaining portion immersed in the stored fluid.

With the introduction of the heat pipes 10, the heat transfer rate between the fluids in the boiler increases because a new energy path is created parallel to the heat conduction through the interface of the two reservoirs. Moreover, when the system heat transfer capacity decreases on account of the thermal insulation effect of the melting material solidified layer, which is formed during the melting material cooling the heat pipes 10 surpass this layer and maintain the heat flux from the liquid melting material to the fluid.

Due the heat pipes ability to maintain isothermal conditions over their lengths and transfer high rates of energy, a better heat distribution is obtained, minimizing the stratification effects, either in the melting material or in fluid regions, additionally increasing the heat transfer speed between the two reservoirs.

Constructively, it is possible to optimize the heat distribution over the heat pipes lengths when they are assembled near the heating device. The process becomes faster because they help to distribute the heat produced in the heating device.

Figure 2:
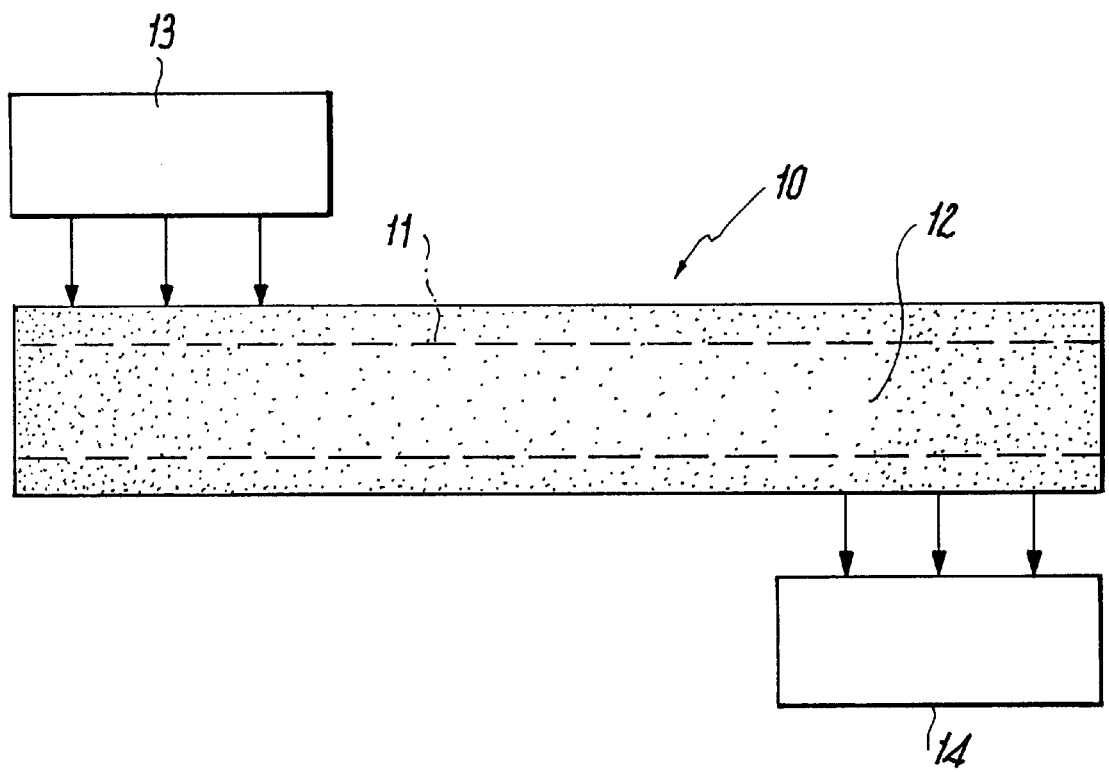
FIG. 2 represents a longitudinal sectional view of a heat pipe used in the present invention.
Figure 3:
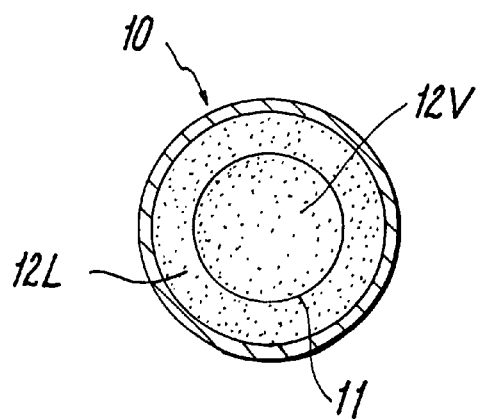
FIG. 3 shows a cross-sectional view of the heat pipe shown in FIG. 2.

Heat pipes are well known devices used for thermal control in coiling of and electronic equipment cooling. They are very efficient exchangers with the basic construction as it is shown in FIGS. 2 and 3. They consist of a closed container 10 with walls made of a high thermal conductive material, as copper or aluminum, and with a porous capillary structure 11 lining their inner surfaces. These porous structures can be a mesh screen, sintered porous metal or grooves cut in the inner surface but they must be saturated with the liquid phase 12L of a working fluid 12.

The container geometry 10 and the porous capillary structure 11 depend on the application and the working fluid 12 chosen, determined by its respective useful temperature range and the desired heat transport capability. As the heat pipe fluid has to work on a cyclic evaporation-condensation phase change, its useful range is limited by the fluid melting and bailing temperatures.

As schematically shown in FIGS. 2 and 3, the internal pressure difference between fluid phases induces the liquid phase 12L into the porous structure 11 and the remained internal volume is fulfilled with the vapor phase 12V.

During the operation, the heat applied at an end 13 of the tube vaporizes the internal liquid 12L of the porous structure 11 and the fluid absorbs a high amount of energy as latent heat of vaporization. The resulting pressure difference in the vapor core 12v drives the working fluid from the hot region to the cold one, where the fluid condensation occurs and the heat is delivered to the surrounding 14. The contact between liquid and vapor phases at the porous structure induces a capillary pression which pumps the liquid 12L to the hot region 13. As the working fluid is in a constant temperature and the tube is made of a high thermal conductive material, the exterior will be an almost the same temperature during all process.

In order to increase the efficiency of the thermal transfer in the hot fluid dispenser, the heating device 8 may be positioned close to at least one heat pipe (10).

I claim:

1. A hot fluid dispenser comprising: a first reservoir (1) for the fluid, having a make up fluid inlet pipe (5), a hot fluid outlet pipe (6); at least one heating source (7, 8) operatively associated with the first reservoir (1) in order to heat the stored fluid; and at least one second reservoir (9) having, with the fluid in the first reservoir (1), an interface of a high thermal conductivity material and containing a melting material having a high latent heat of fusion and a melting point between the solidification and vaporization temperatures of the fluid, characterized in that there is provided a plurality of heat pipes through said interface, each heat pipe (10) having a portion of its extension immersed in the melting material and the remaining portion immersed in the stored fluid, the melting point of the melting material being within the operational temperature range of the heat pipes.

2. The hot fluid dispenser, according to claim 1, characterized in that the fluid is water and in that the melting point of the melting material is between 0° and 100° C.

3. The hot fluid dispenser, according to claim 1, characterized in that the heat source (7, 8) comprises an energy source (7) external to the first and second reservoirs (1, 9) and feeding a heating device (8) mounted inside at least one of said first and second reservoirs (1, 9).

4. The hot fluid dispenser, according to claim 3, characterized in that said second reservoir (9) is mounted inside the first reservoir (1), in order to be at least partially surrounded by the fluid contained in the latter.

5. The hot fluid dispenser, according to claim 4, characterized in that the heat pipes (10) are mounted through the second reservoir (9) in order to have their median portions within the latter and their opposite end portions immersed in the fluid contained in the first reservoir (1).

6. The hot fluid dispenser, according to claim 3, characterized in that the heating device (8) is positioned inside the second reservoir (9).

7. The hot fluid dispenser, according to claim 3, characterized in that the heating device (8) is positioned close to at least one heat pipe (10).

8. The hot fluid dispenser, according to claim 3, characterized in that at least one of the fluid outlet pipe (6) and the make up fluid inlet pipe (5) is mounted close to the heating device (8).

9. The hot fluid dispenser, according to claim 1, characterized in that at least one of the fluid outlet pipe (6) and the make up fluid inlet pipe (5) is mounted through the melting material contained in the second reservoir (9).

10. The hot fluid dispenser, according to claim 1, characterized in that said dispenser is operatively associated with a solar heating assembly comprising a solar collector (2) connected to the first reservoir (1) by a feeding pipe (3) and a return pipe (4).

11. The hot fluid dispenser, according to claim 1, characterized in that the melting material is paraffin.

\* \* \* \* \*